US009973261B1

(12) United States Patent
Hardy et al.

(10) Patent No.: US 9,973,261 B1
(45) Date of Patent: May 15, 2018

(54) RAPIDLY-DEPLOYABLE, DRONE-BASED WIRELESS COMMUNICATIONS SYSTEMS AND METHODS FOR THE OPERATION THEREOF

(71) Applicant: ECHOSTAR TECHNOLOGIES L.L.C., Englewood, CO (US)

(72) Inventors: Chris Hardy, Cheyenne, WY (US); Paul Bellotti, Cheyenne, WY (US)

(73) Assignee: ECHOSTAR TECHNOLOGIES LLC, Englewood, CO (US)

( * ) Notice: Subject to any disclaimer, the term of this patent is extended or adjusted under 35 U.S.C. 154(b) by 0 days. days.

(21) Appl. No.: 15/392,629

(22) Filed: Dec. 28, 2016

(51) Int. Cl.
| | | |
|---|---|---|
| *H04Q 7/20* | (2006.01) |
| *H04B 7/185* | (2006.01) |
| *H04W 4/06* | (2009.01) |
| *B64C 39/02* | (2006.01) |
| *G05D 1/10* | (2006.01) |
| *G01S 5/04* | (2006.01) |
| *H04N 7/18* | (2006.01) |
| *G06K 9/00* | (2006.01) |
| *H04W 84/00* | (2009.01) |

(52) U.S. Cl.
CPC ....... *H04B 7/18504* (2013.01); *B64C 39/024* (2013.01); *G01S 5/04* (2013.01); *G05D 1/104* (2013.01); *G06K 9/0063* (2013.01); *H04B 7/18523* (2013.01); *H04N 7/181* (2013.01); *H04W 4/06* (2013.01); *B64C 2201/021* (2013.01); *B64C 2201/024* (2013.01); *B64C 2201/122* (2013.01); *H04W 84/005* (2013.01)

(58) Field of Classification Search
CPC ............... B64C 39/024; G06Q 20/102; G06Q 2240/00; G07B 15/00; G08G 5/006; H04B 1/3827; H04W 12/08
USPC .......... 455/11.1, 420, 3.02, 427, 13.2, 552.1, 455/556.1, 297; 370/254, 316; 705/338; 342/367; 701/3, 13, 15
See application file for complete search history.

(56) References Cited

U.S. PATENT DOCUMENTS

| | | | |
|---|---|---|---|
| 8,989,922 B2 * | 3/2015 | Jones | G05D 1/102 701/22 |
| 2011/0208373 A1 * | 8/2011 | Lees | B64C 39/024 701/2 |

(Continued)

*Primary Examiner* — Tan H Trinh
(74) *Attorney, Agent, or Firm* — Lorena & Kopf LLP

(57) ABSTRACT

Drone-based wireless communications systems are provided, as are methods carried-out by such wireless communications systems. In one embodiment, the wireless communications system includes a Satellite Signal Transformation (SST) unit and a plurality of aerial network drones, which can be deployed over a designated geographical area to form a multi-drone network thereover. During operation, the SST unit transmits a network source signal, which contains content extracted from a satellite signal. The multi-drone network receives the network source signal, disseminates drone relay signals containing the content through the multi-drone network, and broadcastings user device signals containing the content over the designated geographical area. In embodiments, the multi-drone network may broadcast multiple different types of user device signals for reception by various different types of user devices located within the designated geographical area, such as an area containing communication infrastructure disabled by a natural disaster, a hostile attack, or other catastrophic event.

19 Claims, 5 Drawing Sheets

(56) References Cited

U.S. PATENT DOCUMENTS

| | | | |
|---|---|---|---|
| 2011/0257813 A1* | 10/2011 | Coulmeau | G08G 5/0013 701/2 |
| 2014/0323038 A1* | 10/2014 | Hubbell | H04W 40/20 455/11.1 |
| 2014/0355476 A1* | 12/2014 | Anderson | H04W 24/02 370/254 |
| 2015/0236778 A1* | 8/2015 | Jalali | H04W 84/06 370/316 |
| 2015/0236779 A1* | 8/2015 | Jalali | H04B 7/18508 342/367 |
| 2015/0248640 A1* | 9/2015 | Srinivasan | G06Q 10/08355 705/338 |
| 2016/0171896 A1* | 6/2016 | Buchmueller | G08G 5/0008 701/3 |
| 2016/0247407 A1* | 8/2016 | Paczan | G08G 5/045 |
| 2017/0013476 A1* | 1/2017 | Suthar | H04W 24/02 |
| 2017/0026108 A1* | 1/2017 | Haziza | H04B 1/707 |
| 2017/0041763 A1* | 2/2017 | Jalali | G01S 5/14 |
| 2017/0057635 A1* | 3/2017 | Strayer | B64C 39/024 |
| 2017/0169713 A1* | 6/2017 | Gong | G08G 5/006 |
| 2017/0178518 A1* | 6/2017 | Foladare | G08G 5/0034 |
| 2017/0214462 A1* | 7/2017 | Busche | H04B 7/18504 |
| 2017/0227968 A1* | 8/2017 | Klinger | G05D 1/0214 |
| 2017/0242431 A1* | 8/2017 | Dowlatkhah | G05D 1/0027 |
| 2017/0243494 A1* | 8/2017 | Taveira | G08G 5/006 |
| 2017/0257779 A1* | 9/2017 | Zerick | H04W 16/26 |

* cited by examiner

RAPIDLY-DEPLOYABLE, DRONE-BASED WIRELESS COMMUNICATIONS SYSTEMS AND METHODS FOR THE OPERATION THEREOF

TECHNICAL FIELD

The following disclosure relates generally to communications networks and, more particularly, to drone-based wireless communications systems, which can be deployed on an as-needed basis to distribute satellite-supplied content to user devices within a designated geographical area.

BACKGROUND

Wireless communications networks are now well-established throughout most populated regions of the United States and many other developed regions of the world. The prevalence of such systems, coupled with the widespread adoption of mobile phones and other user devices capable of receiving wireless signals distributed through such networks, has greatly increased the speed and convenience with which users receive and share content, such as text messages, electronic mail, and audiovisual media. As a corollary, populations have become largely reliant on the unfailing availability of such wireless communications systems to serve as a primary mode of information dissemination. This reliance creates a potential vulnerability should the existing wireless communication infrastructure in a particular geographical area become compromised due to a natural disaster, a hostile attack, or other catastrophic event. Similarly, in other instances, the capabilities of existing wireless communications systems (e.g., the bandwidth or spectrum provided by a cellular network) may be insufficient to support wireless communication demands when an exceptionally large group of people congregate in a particular area. When forewarning is provided, certain measures may be taken to boost the wireless communication capabilities in an affected area; e.g., micro-cell towers may be temporarily installed to allow frequency reuse improving carrier capacity. Such measures, however, are often insufficient to fully satisfy the increased loads placed on the wireless communications systems and are associated with other limitations, such as constraints relating to the cost and time required for hardware installation.

BRIEF SUMMARY

Embodiments of a drone-based wireless communications systems are provided. In an implementation, the drone-based wireless communications system includes a Satellite Signal Transformation (SST) unit and a plurality of aerial network drones, such as a plurality of rotary wing drones. The plurality of aerial network drones can be deployed over a designated geographical area to form a wireless multi-drone (e.g., mesh) network thereover. During operation, the SST unit transmits a network source signal containing content extracted from a satellite signal. At least one aerial network drone in multi-drone network receives the network source signal from the SST unit. The aerial network drones then disseminate drone relay signals containing the content through the multi-drone network, while broadcasting user device signals containing the content over the designated geographical area. In embodiments, the multi-drone network may broadcast multiple different types of user device signals for reception by various types of user devices located within the designated geographical area.

Embodiments of an aerial network drone, such as a specialized rotary wing drone, are further provided. In an embodiment, the aerial network drone contains a wireless receiver, an antenna array including at least first and second antennae, and a drone controller architecture coupled to the wireless receiver and to the antenna array. During operation, the drone controller architecture is configured to receive drone relay signals at the wireless receiver as a first signal type, transform the drone relay signals to second and third signal types different than the first signal type, and then broadcast the second and third signal types via the first and second antennae. In certain embodiments, the aerial network drone may further include a flight system operably coupled to the drone controller architecture, which is further configured to command the flight system to generally maintain the aerial network drone in an assigned hover position in a horizontally-spaced drone array.

Still further provided are embodiments of a method carried-out by a drone-based wireless communications system. In an embodiment, the method includes the steps or processes of deploying a plurality of aerial network drones to form a multi-drone network over a designated geographical area, receiving a network source signal via at least one of the plurality of aerial network drones, disseminating drone relay signals containing content extracted from the network source signal through the multi-drone network, and broadcasting user device signals containing the content over the designated geographical area for reception by user devices located therein. In implementations wherein the drone-based wireless communications system further includes a satellite signal transformation unit, the method may further include the step or process of, at the satellite signal transformation unit, receiving a satellite signal from a satellite, extracting the content from the satellite signal, and transmitting the network source signal containing the content to the multi-drone network. In other implementations, the step of deploying may be performed by dispersing the plurality of aerial network drones into a horizontally-spaced drone array in which each drone is assigned a drone-specific hover position. In such implementations, the method may further include transmitting the network source signal from a fixed wing drone to the multi-drone network, while the fixed wing drones flies a repeating or closed-loop flight pattern an altitude above the horizontally-spaced drone array.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
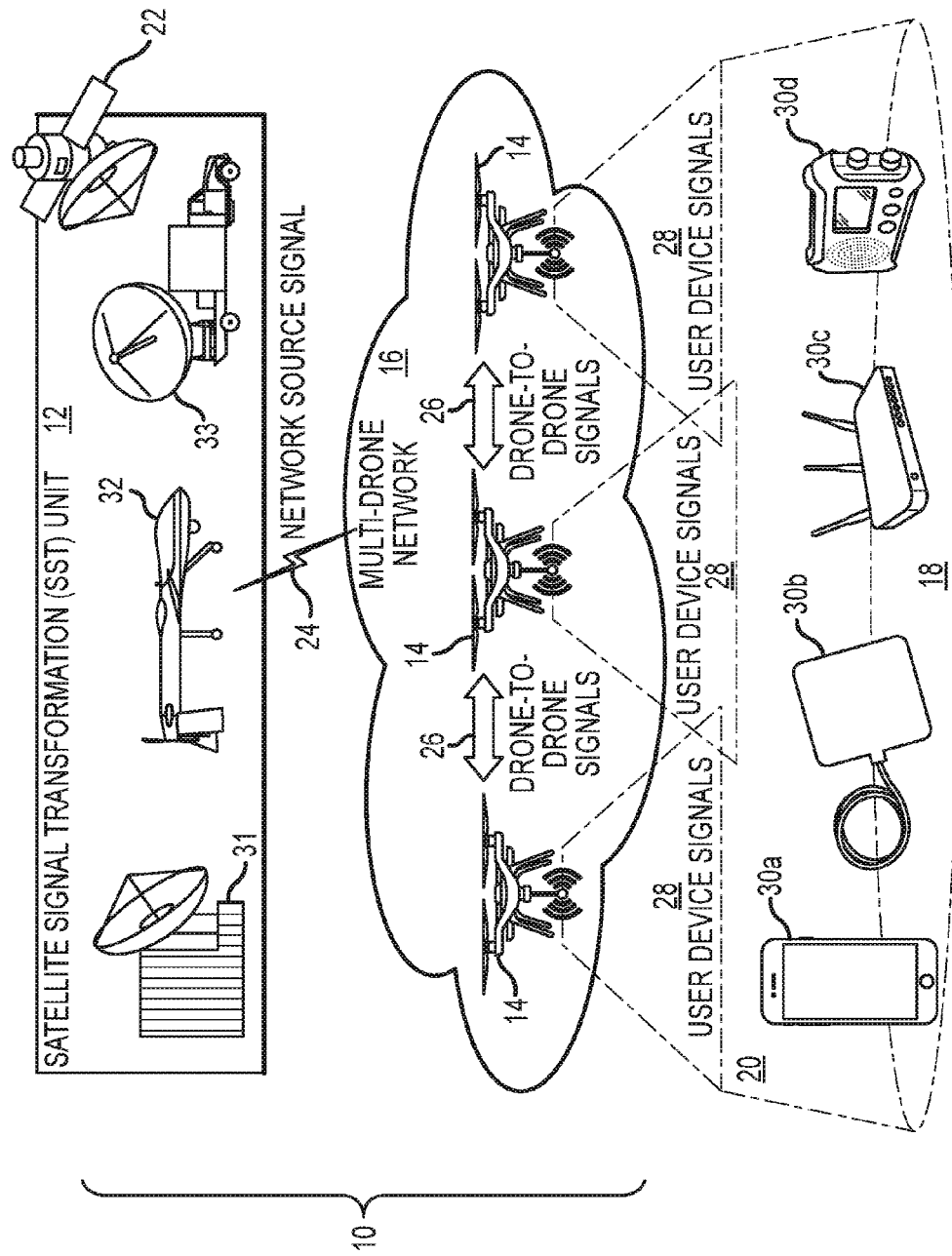
FIG. 1 is a schematic of a drone-based wireless communications system including at least one Satellite Signal Transformation (SST) unit and a plurality of aerial network drones (only a few of which are shown for clarity), as illustrated in accordance with an exemplary embodiment of the present disclosure.

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect. As further appearing herein, the term "drone" encompasses the terms "unmanned aerial vehicle" and "unmanned aircraft system."

The following describes embodiments of a drone-based wireless communications system, which is well-suited for restoring or augmenting wireless communication capabilities throughout a designated geographical region or area. As indicated by the term "drone-based," the wireless communications system includes a plurality of aerial network drones, which cooperate to form a multi-drone (e.g., mesh) network over the designated geographical area. The drone-based wireless communications system also includes at least one Satellite Signal Transformation (SST) unit, which receives satellite signals, extracts content from the satellite signals, repackages (e.g., transcodes) the content into network source signals, and then transmits the network source signals to one or more network drones. The network drones then disseminate drone-to-drone signals containing the content throughout the multi-drone network. The drone-to-drone signals may be transmitted by repeating the network source signal across the multi-drone network. Alternatively, certain network drones may perform additional transformation functionalities to transmit a different signal type between drones containing the desired content. In conjunction with propagating the drone-to-drone signals, the network drones also broadcast user device signals containing the content over the designated geographical area for reception by user devices located therein.

In certain embodiments of the drone-based wireless communications system, the SST unit or units can be transportable terrestrial structures, which may also serve as storage units or hangers for temporarily stowing the network drones prior to deployment. For example, in an embodiment, at least one SST unit can be a transportable ground-supported structure, which may be palletized and deliverable into a designated area by ground transport or airdrop. In other embodiments, the SST unit can be implemented as a truck or other mobile vehicle, which is equipped with a satellite dish, satellite signal transformation circuitry, and an antenna or antenna array for retransmission of content derived from the satellite signal to the drone network. Again, the SST unit may be utilized to transport the network drones into or near the designated geographical area prior to deployment, although this is not necessary in all embodiments. As a further possibility, the wireless communications system may include at least one SST unit in the form of one or more drones. In this regard, embodiments of the wireless communications system may include one or more SST units in the form of high payload fixed wing drones, which fly (e.g., along a closed-loop flight pattern) at an altitude or flight level above the aerial network drone network. In still further embodiments, the SST unit may assume other forms including, for example, that of a tethered aerial platform suspended by balloons, a driven main rotor, or an auto-rotating main rotor.

The drone-based wireless communications system may be utilized to provide multiple different types or formats of wireless signals, which contain media or content derived from satellite signals, to user devices located within a designated geographical region. In so doing, embodiments of the wireless communications system may restore or augment content distribution to user devices capable of receiving wireless signals, such as Radio Frequency (RF) signals in the mid-frequency (MF), high frequency (HF), very high frequency (VHF), and ultrahigh frequency (UHF) bandwidths. Such devices may include, but are not limited to radio receivers, television receivers including cable television systems, mobile phones, and Wi-Fi receivers supporting the operation of various different types of user devices, including home computers and wireless medical devices. The drone-based wireless communications system may thus restore or augment content distribution to those user devices that are incapable of directly receiving satellite signals. This may be vitally important in the event of a catastrophe, such as a natural disaster or hostile attack, in the aftermath of which the affected communication infrastructure remains inoperative and members of the impacted population have limited access to varying types of wireless devices.

Embodiments of the drone-based wireless communications system may also be provided with additional capabilities beyond signal propagation and broadcasting to, for example, further assist with disaster relief. Such additional capabilities may include, but are not limited to the ability to receive incoming signals (e.g., cellular signals) from user devices (e.g., mobile phones) located in the designated geographical area as may be useful when, for example, it is desired to pinpoint the location of devices carried by victims potentially trapped underneath rubble or debris, such as a collapsed structure. In other embodiments, some or all of the network drones may be equipped with sensors, such as video cameras, infrared sensors, millimeter wave radar, or the like, capable of capturing and returning imaging data of the designated geographical area useful in search-and-rescue efforts. In such embodiments, the multi-drone network may provide corresponding data to the SST unit, another datalink-connected authority, or may instead communicate directly with other authorized wireless devices (e.g., mobiles phones, tablets, or the like) carried by first responders or other personnel located on the ground. Exemplary embodiments of such a drone-based wireless communications system will now be described in conjunction with FIGS. 1-4.

Detailed Example of the Drone-Based Wireless Communications System

FIG. 1 is a schematic of a drone-based wireless communications system 10, as illustrated in accordance with an exemplary embodiment of the present disclosure. Drone-based wireless communications system 10 includes at least one SST unit 12 and a plurality of aerial network drones 14. When deployed, aerial network drones 14 disperse or spread-out to form a multi-drone network 16 over a designated geographical region or area 18. In embodiments, multi-drone network 16 may be implemented as a mesh network such that each aerial network drones 14 serves a node, which relays data to other nearby drones 14 contained within mesh network 16. During operation of wireless communications system 10, SST units 12 receive satellite signals from at least one satellite 22. The satellite signals may be received as a continuous data stream or as intermittent transmissions, such as burst-type signals. The satellite signals contain content, such as public broadcasting messages, which is desirably transmitted to user devices located within geographical area 18. SST units 12 extract this content from the satellite signal and transcode or otherwise repackage the content into non-satellite signals or "network source signals" suitable for reception by one or more drones 14. SST units 12 then transmit the network source signal to mesh network 16, as indicated in FIG. 1 by graphic 24.

While only three aerial network drones 14 are shown in FIG. 1 to avoid cluttering the drawing, drone-based wireless communications system 10 will typically contain a significantly larger number of aerial network drones, as appropriate to provide complete or substantially complete coverage throughout coverage zone 20 and across designated geographical area 18. Furthermore, as indicated in FIG. 1, aerial network drones 14 usefully assume the form of rotorcraft, such as quadcopters or other multi-rotor unmanned aircraft, which are capable of prolonged and stable hovering. In further embodiments, aerial network drones 14 can assume other forms including, for example, that of lighter-than-air or fixed wing aircraft. In certain embodiments, drone-based wireless communications system 10 may contain multiple different types of aerial network drones 14, which collectively form multi-drone network 16 when dispersed over geographical area 18 to carry-out the below-described functionalities.

In an embodiment wherein drones 14 are rotary wing drones or another type of drone capable of hovering, aerial network drones 14 are each assigned a hover position within the horizontally-spaced drone array. From a top down or planform perspective, the hover position can be defined as a fixed position in space (e.g., a latitude and longitude) or a relative position (e.g., a set distance from one or neighboring drones within the array). The horizontally-spaced drone array may be two dimensional (2D) or single level such that aerial network drones 14 all hover at a single, set altitude. Alternatively, horizontally-spaced drone array may be three dimensional or tiered such that different subsets of aerial network drones 14 hover at different altitudes. Aerial network drones 14 can disperse into any suitable spatial configuration for providing substantially uninterrupted or continuous coverage across designated geographical area 18. In one embodiment, aerial network drones 14 may disperse into a horizontally-spaced drone array, such as drone array 34 described below in conjunction with FIG. 3. Aerial network drones 14 may also periodically reconfigure or move in response to commands received from SST units 12 or another control authority. Additionally, during operation of multi-drone mesh network 16, the relative positioning of aerial network drones 14 may be readjusted as appropriate (e.g., in accordance with swarm intelligence logic) to close any gaps in coverage should one of aerial network drones 14 become non-responsive or non-functional.

During operation, aerial network drones 14 receive network source signals 24 from SST units 12 and then disseminate drone relay signals 26 containing the content throughout multi-drone mesh network 16. Concurrently, aerial network drones 14 broadcast user device signals 28, which further contain the content, over a coverage zone 20 encompassing geographical area 18. Notably, multi-drone mesh network 16 can broadcast any number and type of user device signals 28 for reception by various user devices 30 located within geographical area 18. In embodiments wherein drone-based wireless communications system 10 is utilized for disaster response, specifically, it may be desirable for multi-drone mesh network 16 to broadcast multiple different signal types suitable for reception by a wide range of commercially-available consumer devices as different members of the affected population may have limited access to different types of devices. As briefly indicated above, a non-exhaustive list of such user devices includes radio receivers, television receivers including cable television systems, mobile phones, and Wi-Fi receivers supporting the operation of various different types of user devices, including home computers and wireless medical devices. Further illustrating this point, a limited number of exemplary devices are shown in FIG. 1 and include a cellular phone 30(*a*), a high definition television (HDTV) antenna 30(*b*), a wireless router 30(*c*), and a radio receiver 30(*d*). Multi-drone mesh network 16 may broadcast Over-The-Air (OTA) television signals, cellular signals, broadband signals, Amplitude Modulated (AM) radio signals, Frequency Modulated (FM) radio signals, shortwave radio signals, and other RF telecommunications signals within MF, HF, VHF, and UHF bandwidths. In certain embodiments, multi-drone mesh network 16 may also transmit media streams in a standard packetized format, such as a Transmission Control Protocol/Internet Protocol (TCP/IP) or IP User Datagram Protocol (UDP) format.

Drone-based wireless communications system 10 may contain any number and type of SST units 12 suitable for providing the functions described herein. In many instances, wireless communications systems 10 may contain only a single SST unit 12 or, perhaps, two similar SST units 12 for purposes of redundancy. In the embodiment shown in FIG. 1, wireless communications system 10 is illustrated as containing three different types of SST units 12: a portable freestanding structure 31, a fixed wing SST drone 32, and a satellite truck 33. With respect to portable freestanding structure 31 and satellite truck 33, these SST units 12 each serve as a specialized satellite earth station, which is uniquely adapted to extract content from incoming satellite signals, repackage (e.g., transcode) the content into network source signals, and then transmit the network source signals to one or more of aerial network drones 14 for dissemination throughout multi-drone mesh network 16. Additionally, in certain implementations, freestanding structure 31 and/or satellite truck 33 may provide final signal transformation functionalities (that is, transform the incoming satellite signal into one or more formats ultimately received by user devices) and then directly broadcast signals to nearby user devices. In this case, freestanding structure 31 and/or satellite truck 33 may be equipped with appropriate broadcasting equipment to serve as, for example, a portable cellular cite or radio tower.

Rapid deployment of drone-based wireless communications system 10 may be streamlined by leveraging freestanding structure 31 and/or satellite truck 33 to stow and transport aerial network drones 14 prior to drone launch. For example, in the case of satellite truck 33, an operator may first drive satellite truck 33 to a selected site within or adjacent designated geographical area 18, while truck 33 carries drones 14 as cargo. After satellite truck 33 reaches its destination, aerial network drones 14 may then be launched from truck 33. Similarly, freestanding structure 31 may be delivered to a selected location within or adjacent designated geographical area 18 by, for example, ground transport, water transport, or airdrop. To facilitate such transport, freestanding structure 31 may be palletized and house aerial network drones 14 prior to deployment thereof. After freestanding structure 31 has been delivered to the selected location, aerial network drones 14 may then be launched from structure 31 with or without manual assistance; e.g., in certain embodiments, structure 31 and aerial network drones 14 may support a fully automated drone launch and dispersal. In this manner, multiple palletized structures can potentially be airdropped by a cargo plane at different sites across a region or area affected by a widespread catastrophic event, such as an earthquake, tsunami or tidal wave, hurricane or typhoon, storm surge, or coordinated hostile attack disabling large swathes of communication infrastructure.

In further embodiments, SST units 12 can include one or more fixed wing SST drones, such as fixed wing SST drone 32 shown in FIG. 1. Several advantages may be achieved through the usage of mid- to large-size fixed wing SST drones as SST units 12. Relative to ground-supported SST units, such as freestanding structure 31 and satellite truck 33, fixed wing SST drones (e.g., SST drone 32) can be deployed with greater rapidity and flexibility; e.g., one or more fixed wing drones can readily fly over geographical areas that may be difficult to access by ground due to debris-obstructed roadways. Relative to rotary wing drones, fixed wing SST drones often have enhanced operative ranges and are capable of remaining aloft for extended periods of time due to, for example, liquid fuel payloads and operation at higher altitudes. Additionally, fixed wing SST drones are typically able to carry heavier payloads including, for example, a satellite dish or receiver of the type described below. In further implementations, SST units 12 can assume other forms in addition to or in lieu of those described above. For example, in other embodiments, SST units 12 may be realized as rotorcraft, lighter-than-air aircraft, or tethered airborne platforms maintained aloft by powered or unpowered (e.g. auto-rotating) main rotors. Furthermore, in implementations wherein SST units 12 are airborne, such as units may be equipped with solar panels or other energy harvesting devices (e.g., air-driven turbine and generator systems) to extend mission capabilities.

Figure 2:
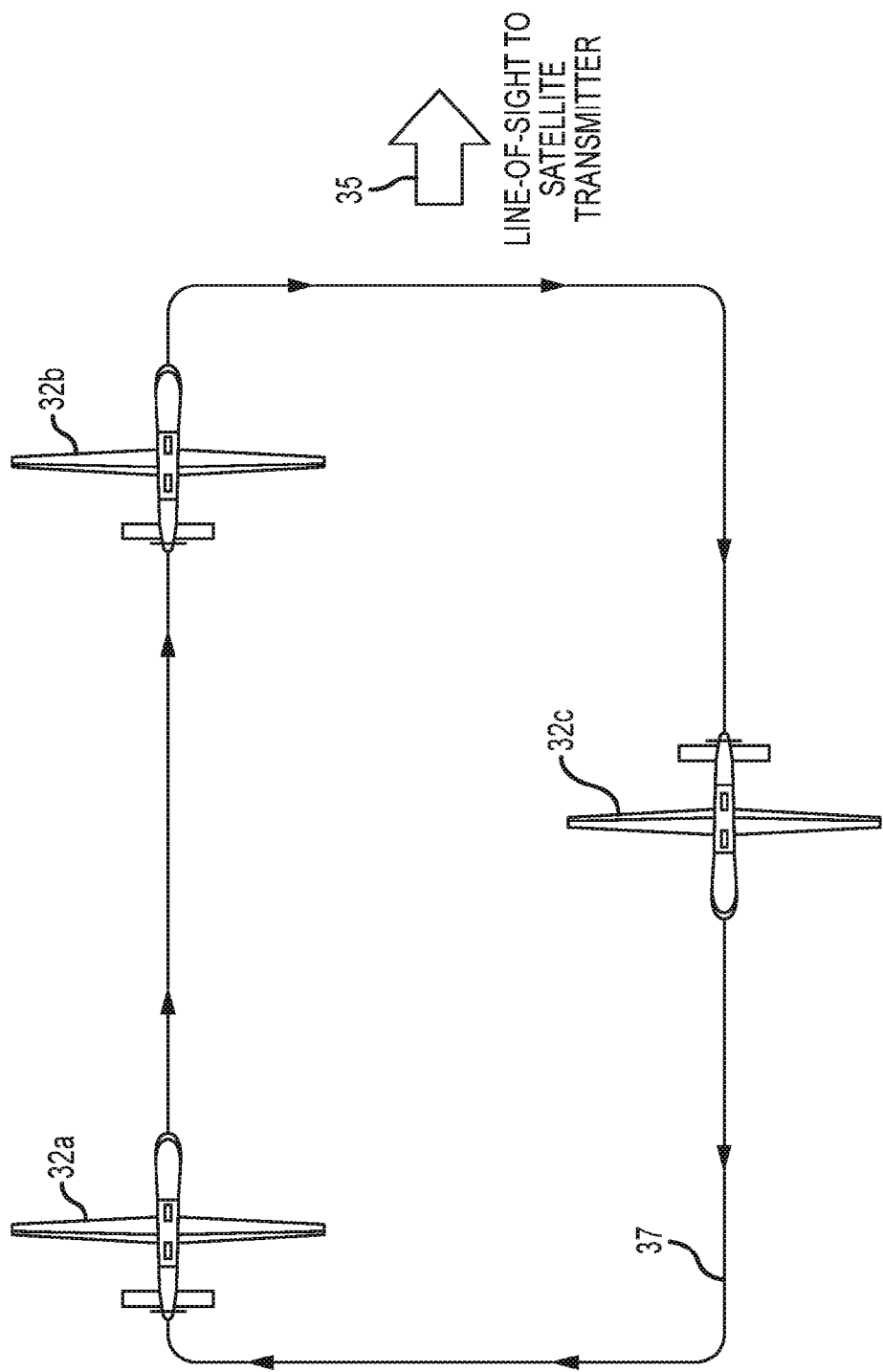
FIG. 2 is a schematic of a plurality of fixed wing SST drones, which may fly a repeating or closed-loop flight pattern at an altitude above the horizontally-spaced drone array shown in FIG. 3 in an exemplary and non-limiting embodiment of the present disclosure.

When SST units 12 include one or more fixed wing SST drones, such as drone 32 shown in FIG. 1, the fixed wing drones may fly in an assigned pattern at a flight level above multi-drone network 16. This may be appreciated by briefly referring to FIG. 2, which illustrates three fixed wing SST drones 32(a)-(c) traveling a repeating or closed-loop flight pattern 37. In embodiments wherein fixed wing SST drones 32(a)-(c) carry fixed-position satellite receivers detecting satellite signals transmitted by one or more geosynchronous satellite, the configuration of flight pattern 37 and the separation between drones 32(a)-(c) may be selected to ensure that at least one fixed wing SST drone 32(a)-(c) maintains a line-of-sight (LOS) with a region of space overlying the equator, as indicated in FIG. 2 by graphic 35. Regardless of the particular form or forms assumed by units 12, SST units 12 provide at least one network source signal propagated across multi-drone mesh network 16 as drone-to-drone signals transmitted amongst aerial network drones 14. When deployed, aerial network drones 14 disperse into a fixed flight formation having predetermined spacing when viewed from top-down or planform perspective (hereafter, a "horizontally-spaced drone array") to facilitate the signal propagation and broadcast functionalities of network drones 14. Further description of an exemplary horizontally-spaced drone array will now be described in conjunction with FIG. 3.

Additional Description of Exemplary Drone Array

Figure 3:
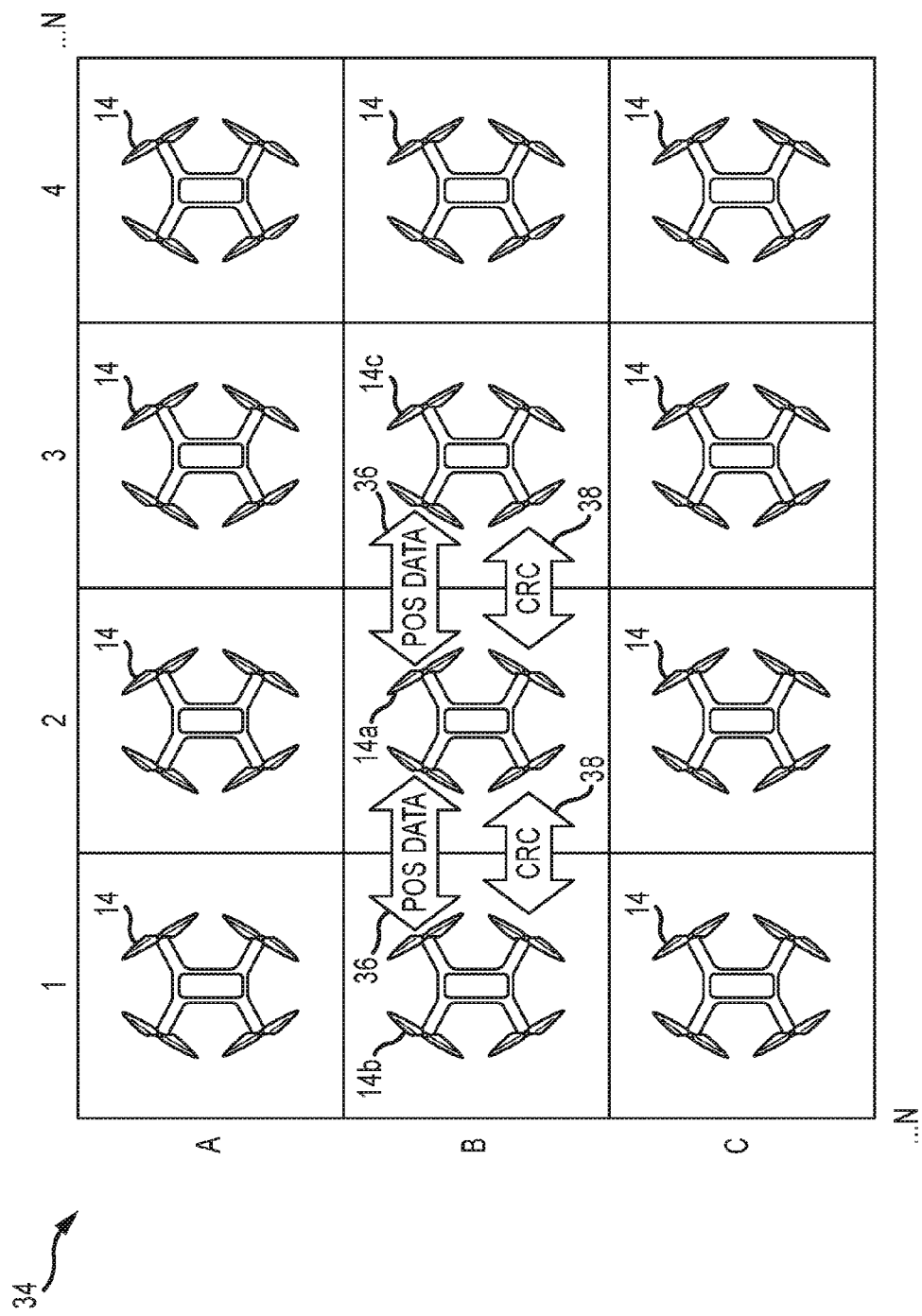
FIG. 3 is top-down schematic of a horizontally-spaced drone array (partially shown) that may be formed by the plurality of aerial network drones shown in FIG. 1 when deployed over a designated geographical area.

FIG. 3 illustrates a portion of a horizontally-spaced drone array 34 into which aerial network drones 14 may organize when forming multi-drone mesh network 16 (FIG. 1). Drone array 34 is not drawn to scale, with the lateral drone-to-drone separation greatly reduced for purposes of illustration. As can be seen, the illustrated portion of drone array 34 is a 2D grid array including three rows A-C and four columns 1-4, which separate a total of twelves drones 14 hovering at the same or similar altitude. In other embodiments, horizontally-spaced drone array 34 may have a different spatial configuration, may contain a different number of rows or columns of drones, and/or may include multiple vertically-separated levels of drones. Drones 14 within horizontally-spaced drone array 34 may be substantially identical or, instead, may vary in function and design. In certain embodiments, the functionalities described herein may be divided amongst drones 14 in various different manners. For example, drones 14 contained in the odd numbered columns (columns 1 and 3) may transcode the content contained in the drone-to-drone signals to a first type of user device format, such as an OTA TV signal, while drones 14 contained in the even numbered columns (columns 2 and 4) may transcode pertinent content to a second type of user device format, such as a radio broadcast.

Each aerial network drone 14 may monitor its own position (referred to herein as the "ownship drone position") within multi-drone mesh network 16 (FIG. 1) utilizing a triangulation approach. For example, in an embodiment, each aerial network drone 14 may receive vector data or other positioning data (e.g., latitude and longitude coordinates) from at least two neighboring drones 14 within horizontally-spaced drone array 34, as indicated in FIG. 3 by double-headed arrows 36. Each drone 14 may also receive additional positioning data from another reference point located above or below horizontally-spaced drone array 34. For example, additional positioning data may be received from a satellite, such as satellite 22 shown in FIG. 1, or one or more of SST units 12. Similarly, in embodiments wherein SST units 12 assume the form of fixed wing SST drones, aerial network drones 14 may triangulate their respective positions by periodically receiving vector or positioning data from neighboring aerial network drones in horizontally-spaced drone array 34 and positioning data from at least one SST unit 12 flying an altitude above drone array 34. In this case, the fixed wing SST drones serving as SST units 12 can fly in a predetermined pattern at a flight level overlying horizontally-spaced drone array 34, as described above in conjunction with FIG. 2. In this manner, each aerial network drone 14 may repeatedly estimate an ownship drone position based, at least in part, on data received from at least one neighboring drone included in the plurality of aerial network drones; and implement flight adjustments to maintain the ownship drone position within a predetermined proximity of the drone-specific hover position.

In certain embodiments, aerial network drones 14 may help ensure data integrity by performing periodic data checks utilizing, for example, a Cyclic Redundancy Check (CRC) approach. This may be appreciated by referring to network drones 14(a)-(c) identified in FIG. 3, with the following description focusing on network drone 14(a), but equally applicable to the other drones 14 within horizontally-spaced drone array 34. During operation of wireless communications system 10 (FIG. 1), drone 14(a) may periodically capture a CRC image of the signal stream or medium after transcoding (hereafter, the "ownship CRC image"). Network drone 14(a) may then query at least two neighboring network drones 14, such as drones 14(b), 14(c) in FIG. 3, for corresponding CRC images (hereafter, the "peer CRC images"). After receiving the corresponding CRC images from network drones 14(b), 14(c), network drone 14(a) then compares the peer CRC images to the ownship CRC images, as well as comparing the peer CRC images to each other, to determine whether any discrepancies exist. If the peer CRC images match, while the ownship CRC image contains a non-acceptable level of discrepancies, network drone 14(*a*) replaces the non-matching portion of the CRC images (e.g., one or more transcoded frames) with the peer CRC images. Alternatively, if discrepancies are identified between the peer CRC images, network drone 14(*a*) may proceed with broadcasting utilizing the ownship drone CRC image. In further embodiments, network drones 14 may perform a different CRC process or another data validation approach prior to broadcast of the user device signals.

Additional Description of Exemplary Satellite Signal Transformation Units

Figure 4:
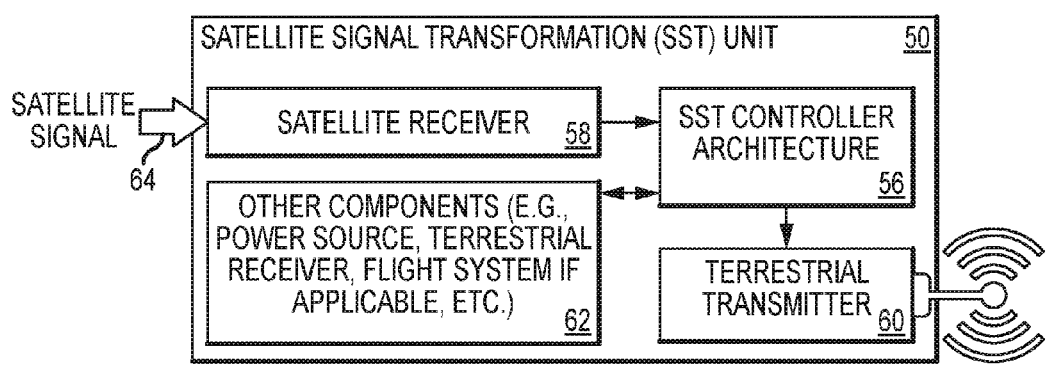
FIGS. 4 and 5 are block diagrams of an exemplary SST unit and an exemplary aerial network drone, respectively, suitable for inclusion in the drone-based wireless communications system shown in FIG. 1.

FIG. 4 is a block diagram of an SST unit 50, which may be representative of any or all of SST units 12 shown in FIG. 1. SST unit 50 includes an SST controller architecture 56, a satellite receiver 58 coupled to an input of controller architecture 56, and a terrestrial transmitter 60 coupled to an output of controller architecture 56. Additionally, SST unit 50 may include any number of additional components 62, which are not individually shown in FIG. 4. For example, in embodiments wherein bidirectional communication is permitted between SST unit 50 and the aerial network drone, SST unit 50 may also include an appropriate receiver, which may be combined with terrestrial transmitter 60 as a transceiver. SST unit 50 will also include various other conventional known components depending upon the particular form assumed by unit 50; e.g., when assuming the form of a drone, such as fixed wing SST drone 32 shown in FIG. 1, unit 50 will include a flight guidance system similar to flight system 74 described below in conjunction with aerial network drone 66.

SST controller architecture 56 can be implemented utilizing any suitable number of individual microprocessors, navigational equipment, memories, power supplies, storage devices, interface cards, and other standard components known in the art. In this regard, SST controller architecture 56 encompasses systems or distributed processing architectures including multiple discrete controllers or processing devices, which are operatively interconnected to perform the various methods, process tasks, calculations, and display functions described herein. Furthermore, controller architecture 56 may include or cooperate with any number of software programs, firmware programs, or other computer-readable instructions. The components of SST unit 50 can be interconnected utilizing any suitable electronic architecture, which may include physical connections (e.g., a data bus) and/or wireless connections.

During operation of SST unit 50, SST controller architecture 56 receives a satellite signal via satellite receiver 58, as indicated in FIG. 4 by arrow 64. The incoming satellite signal may be received in a standardized format, such as an MPEG-2 transport stream format. SST controller architecture 56 then converts the incoming satellite signal to a multicast IP stream in accordance with a predetermined standardized protocol, such as a UPD or Real-time Transport Protocol ("RTP") schemes. In this case, any currently-known or later-developed packetized format can be utilized including MPEG, QUICKTIME, WINDOWS MEDIA, and/or other formats suitable for transmission to multi-drone mesh network 16 (FIG. 1). Afterwards, SST unit 50 transmits the IP stream via terrestrial transmitter 60 to the appropriate drones 14 included in multi-drone mesh network 16. Aerial network drones 14 then disseminate drone relay signals 26 containing the content throughout multi-drone network 16, while broadcasting user device signals 28 containing the content over coverage zone 20 and geographical area 18.

Additional Description of Exemplary Network Drones

Figure 5:
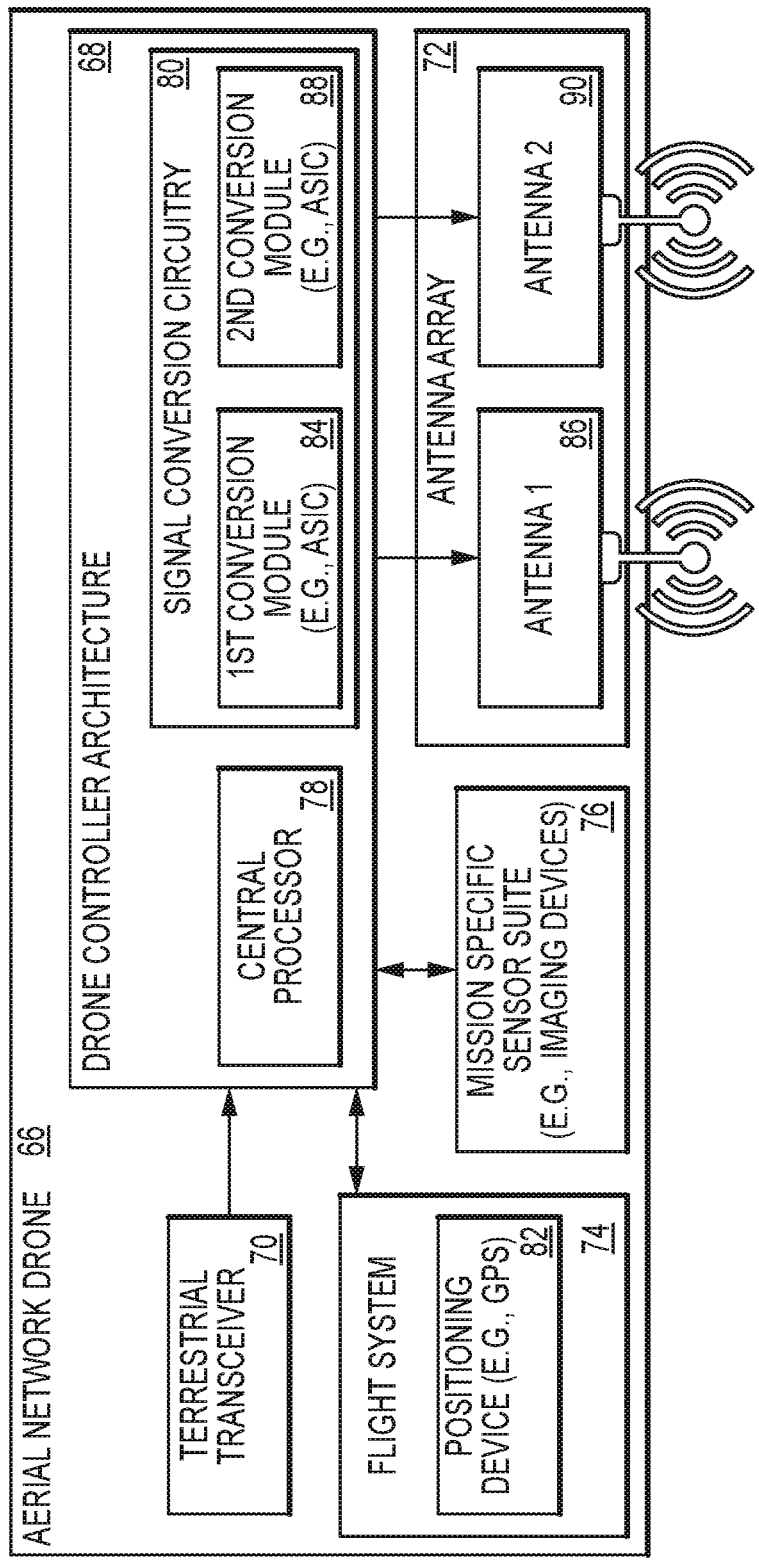

Aerial network drones 14 are equipped with those components appropriate for send and receiving drone relay signals to disseminate the content through multi-drone mesh network 16 (FIG. 1), as well to broadcast user device signals containing the content to user devices located within designated geographical area 18. Additionally, aerial network drones 14 may include those components required for the conversion of the drone relay signals to one or more types of user device signals for broadcast over coverage zone 20. An example of an aerial network drone 14 is further shown in FIG. 5 and identified by reference number "66." In the illustrated example, aerial network drone 66 includes the following components, each of which may be comprised of multiple devices, systems, or elements: (i) a drone controller architecture 68, (ii) a terrestrial transceiver 70 coupled to an input and an output of controller architecture 68, (iii) an antenna array 72 coupled to one or more outputs of controller architecture 68, (iv) a flight system 74 coupled to controller architecture 68 for bidirectional communication therewith, and (v) a mission-specific sensor suite 76. The components of aerial network drone 66 can be interconnected utilizing any suitable aircraft architecture, which may include physical connections (e.g., provided through an avionic data bus) and/or wireless connections.

Finally, Drone controller architecture 68 and flight system 74 cam be implemented utilizing various hardware, software, and firmware components. Additionally, flight system 74 may include sensors for monitoring parameters relating to network drone 66 including, for example, a positioning device 82, such as Global Positioning System ("GPS") device, for monitoring the position of drone 66. By comparison, drone controller architecture 68 may include, for example, a central processor 78 and dedicated signal conversion circuitry 80. During operation of aerial network drone 66, the network source signal transmitted from SST unit 80 is received at terrestrial transceiver 70. Drone controller architecture 68 then retransmits the network source signal via transceiver 70 as a drone relay signal for reception by nearby drones 14, which, in turn, propagate the drone relay signals through multi-drone mesh network 16 (FIG. 1). The drone relay signals may be transmitted in a packetized format (e.g., as TCP/IP and/or UDP/IP packets) accordance with well-known local area or wide area protocols conforming to, for example, IEEE 902.3 and/or IEEE 902.11 standards. In one embodiment, multi-drone mesh network 16 is implemented as a mesh network wherein each network drone 14 or node relays cooperate to distribute data (the drone relay signals) through mesh network 16. The drone relay signals may or may not be encrypted.

In addition to the above-described relay function, aerial network drone 66 also provide signal transformation and broadcasting functionalities. In embodiment, the incoming source signal may be received as a packetized stream containing audio and video component streams, which are transcoded or otherwise transformed utilizing dedicated conversion modules and then provided to corresponding antennae in antenna array 72 for broadcast. For example, to provide a radio (e.g., FM) broadcast, central processor 78 may separate the incoming satellite signals into component streams utilizing, for example, Packet Identifier (PIDs) information embedded in the signals. Central processor 78 may then route the audio stream to a first conversion module 84 included in conversion circuitry 80. Conversion module 84 converts the audio component stream to a first type of signal (e.g., an FM radio signal), which is then supplied to a corresponding antenna (e.g., an FM antenna 86) included antenna array 72 for broadcast. Concurrently, central processor 78 may also route both audio and video streams to a second conversion module 88 for conversion to a second type of signal, such as an OTA television signal, which is then delivered to a second signal-specific antenna 90 within array 72. In one embodiment, the conversion circuitry contained within modules 84, 88 may each include one or more Application Specific Integrated Circuits (ASICs), possibly packaged with other microelectronic devices as a System-in-Package (SiP) or microelectronic module, for reduced cost and enhanced efficiency. In further embodiments, signal conversion circuitry 80 may include a different type or number of conversion modules capable of converting the incoming drone signals various different types of user device signals in the above-described manner.

As previously indicated, embodiments of drone-based wireless communications system 10 may also be provided with additional capabilities beyond signal propagation and broadcast to, for example, assist with disaster response efforts. Such additional capabilities may include, but are not limited to, the ability to receive incoming signals (e.g., cellular signals) from user devices located in the designated geographical area as may be useful when, for example, it is desired to pinpoint a particular device carried by a person in need of help, such as a person trapped underneath rubble or debris. In this case, network drones 14 may be utilized to locate lost or stranded people possessing mobile phones or other electronic devices capable of conducting a so-called "ping test"; that is, able to return data packet to a server. In such an embodiment, network drones 14 may have different signal strengths such personnel could locate devices in the drone constellation, which may be mapped by each network drones 14. Network drones 14 may then provide corresponding data to a control authority on-the-ground personnel to help locate individuals in need of help and possessing user devices. Stated differently, network drones 14 and, more generally drone-based wireless communications system 10 (FIG. 1) may selectively transmit a request to return location data to a specific user device and then transit the requested location data to an appropriate authority if received from the specific user device. In further embodiments, wireless communications system 10 (FIG. 1) may permit bidirectional communication with user devices within geographical area 18 (FIG. 1) in a packetized format to, for example, serve as a Local Area Network (LAN) or Wireless Area Network (WAN) to which user devices can connect. In this case, all or a subset of network drones 14 may be equipped with cellular antennae configured to receive wireless signals from user devices located within designated geographical area 18.

In other embodiments, some or all of the aerial network drones may be equipped with sensors, such as video cameras, infrared sensors, millimeter wave radar, or the like, capable of capturing and returning image data of the designated geographical area. In this manner, network drones 14 may also capture and return sensor data useful in search-and-rescue efforts, such as heat maps of designated geographical region 18 (FIG. 1) to assist with the location of lost, stranded, or trapped members of the affected population. When provided on network drones 14, such imagining sensors may return data as raw video frames captured from video memory are converted from a conventional bitmap or similar format to a compressed streaming video format suitable for transmission and/or routing on multi-drone mesh network 16. Such formats can include, but are not limited to, WINDOWS MEDIA PLAYER, QUICKTIME, MPEG, and similar formats. Compression, encryption, and/or other processing can also be applied. If desired, audio data may be captured in addition to video content. Video, audio, and/or any other streams can then be concatenated or otherwise combined and transmitted on multi-drone mesh network 16 for delivery to SST units 12 (FIG. 1) or another control authority associated with wireless communications system 10. In various embodiments, the media stream is packetized into a suitable format and transmitted to media catcher over multi-drone mesh network 16 in conventional TCP/IP and/or UDP/IP packets, although alternative embodiments may utilize other networking schemes and structures.

CONCLUSION

Multiple embodiments of a drone-based wireless communications systems have thus been provided. In the above-described exemplary embodiments, the drone-based wireless communications system includes at least one SST unit and a plurality of aerial (e.g., rotary wing) drones, which are deployed over a designated geographical area to form a multi-drone (e.g., mesh) network thereover. During operation, the SST unit transmits a network source signal containing content extracted from a satellite signal. At least one aerial network drone in multi-drone network receives the network source signal from the SST unit. The aerial network drones then disseminate drone relay signals containing the content throughout the multi-drone network, while broadcasting user device signals containing the content over the designated geographical area. The multi-drone network may broadcast multiple different types of user device signals for reception by various different types of user devices located within the designated geographical area. The communications system may thus restore or augment content distribution to user devices incapable of directly receiving satellite signals, but capable of receiving terrestrial RF signals. The signal broadcasting and transformation functionalities performed by the multi-drone network can be individually performed by each aerial network drone or, instead, divided among multiple different types of aerial network drones. The aerial network drones can vary in size, shape, and capabilities; and, in certain embodiments, some or all of the aerial network drones may be capable of receiving incoming user device signals, of providing sensor data (e.g., infrared or visible spectrum imaging data), and/or providing additional functionalities useful in search-and-rescue efforts.

In one implementation, the drone-based wireless communications system includes an SST unit, such as a fixed wing drone and a plurality of aerial network drones, such as a plurality of rotary wing drones. The plurality of aerial network drones can be deployed over a designated geographical area to form a wireless multi-drone (e.g., mesh) network thereover. During operation, the SST unit transmits a network source signal containing content extracted from a satellite signal. At least one aerial network drone in multi-drone network receives the network source signal from the SST unit. The aerial network drones then disseminate drone relay signals containing the content through the multi-drone network, while broadcasting user device signals containing the content over the designated geographical area. In certain implementations, the drone-based wireless communications system at least a first aerial network drone included in the plurality of aerial network drones may include a wireless receiver, an antenna array including first and second antenna (e.g., antennae 86, 88 included in antenna array 72 shown in FIG. 5) and a drone controller architecture, which receives drone relay signals as a first signal type (e.g., a packetized network format), transforms the drone relay signals to second and third signal types (e.g., utilizing ASIC-containing conversion modules 84, 88 shown in FIG. 5), and then broadcast the second and third signal types via the first and second antennae, respectively.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A drone-based wireless communications system, comprising:
    a satellite signal transformation unit configured to receive a satellite signal from a satellite, to extract content from the satellite signal, and to transmit a network source signal containing the content; and
    a plurality of aerial network drones deployable to form a multi-drone network over a designated geographical area, the multi-drone network configured to:
        receive the network source signal from the satellite signal transformation unit;
        disseminate drone relay signals containing the content through the multi-drone network; and
        broadcast user device signals containing the content over the designated geographical area for reception by user devices located therein;
    wherein, when forming the multi-drone network, each aerial network drone in the plurality of aerial network drones repeatedly triangulates an ownship drone position as a function of (i) data received from multiple neighboring aerial network drones in the plurality of aerial network drones and (ii) data received from at least one of the satellite and the satellite signal transformation unit.

2. The drone-based wireless communications system of claim 1 wherein the satellite signal transformation unit comprises a fixed wing drone, and wherein the plurality of aerial network drones comprises a plurality of rotary wing drones.

3. The drone-based wireless communications system of claim 2 wherein the fixed wing drone is configured to fly a repeating flight pattern above the plurality of rotary wing drones during operation of drone-based wireless communications system.

4. The drone-based wireless communications system of claim 1 wherein at least a first aerial network drone included in the plurality of aerial network drones comprises:
    a wireless receiver;
    a first antenna; and
    a drone controller architecture coupled to the wireless receiver and to the antenna, the drone controller architecture configured to:
        receive the drone relay signals at the wireless receiver as a first signal type;
        transform the drone relay signals to a second signal type; and
        broadcast the second signal type via the first antenna.

5. The drone-based wireless communications system of claim 4 wherein the first aerial network drone further comprises a second antenna, and wherein the drone controller architecture is further configured to:
    transform the drone relay signals to a third signal type; and
    broadcast the third signal type via the second antenna, while concurrently boarding the second signal type via the first antenna.

6. The drone-based wireless communications system of claim 5 wherein the drone controller architecture comprises first and second Application Specific Integrated Circuit-containing (ASIC-containing) modules configured to receive the drone relay signal from the wireless receiver and to transform the drone relay signals to the second and third signal types, respectively.

7. The drone-based wireless communications system of claim 1 wherein the plurality of aerial network drones disperses into a horizontally-spaced drone array when deployed over the designated geographical area.

8. The drone-based wireless communications system of claim 7 wherein each aerial network drone in the plurality of aerial network drones is configured to:
    repeatedly estimate an ownship drone position based, at least in part, on data received from at least one neighboring drone included in the plurality of aerial network drones; and
    implement flight adjustments to maintain the ownship drone position within a predetermined proximity of an assigned hover position in the horizontally-spaced drone array.

9. The drone-based wireless communications system of claim 1 wherein the satellite signal transformation unit is configured to stow the plurality of drones prior to deployment thereof.

10. The drone-based wireless communications system of claim 1 wherein the plurality of aerial network drones includes at least one aerial network drone equipped with imaging sensors configured to capture image data of a portion of the designated geographical area.

11. The drone-based wireless communications system of claim 1 wherein each aerial network drone in the plurality of aerial network drones is configured to perform a cyclic redundancy check process utilizing data provided by at least one neighboring aerial network drones prior to broadcasting user device signals across the designated geographical area.

12. A drone-based wireless communications system, comprising:
    a satellite signal transformation unit configured to receive a satellite signal from a satellite, to extract content from the satellite signal, and to transmit a network source signal containing the content; and
    a plurality of aerial network drones deployable to form a multi-drone network over a designated geographical area, the multi-drone network configured to:
        receive the network source signal from the satellite signal transformation unit;
        disseminate drone relay signals containing the content through the multi-drone network; and
        broadcast user device signals containing the content over the designated geographical area for reception by user devices located therein;
    wherein the plurality of aerial network drones includes at least a first aerial network drone equipped with a cellular antenna configured to receive wireless signals from user devices located within the designated geographical area, the first aerial network drone configured to:
selectively transmit a request to return location data to a specific user device; and
transmit the requested location data to an authority if received from the specific user device.

13. The drone-based wireless communications system of claim 12 wherein the satellite signal transformation unit comprises a fixed wing drone, and wherein the plurality of aerial network drones comprises a plurality of rotary wing drones.

14. The drone-based wireless communications system of claim 12 wherein the plurality of aerial network drones disperses into a horizontally-spaced drone array when deployed over the designated geographical area.

15. The drone-based wireless communications system of claim 14 wherein each aerial network drone in the plurality of aerial network drones is configured to:
repeatedly estimate an ownship drone position based, at least in part, on data received from at least one neighboring drone included in the plurality of aerial network drones; and
implement flight adjustments to maintain the ownship drone position within a predetermined proximity of an assigned hover position in the horizontally-spaced drone array.

16. An aerial network drone, comprising:
a wireless receiver;
an antenna array including at least first and second antennae; and
a drone controller architecture coupled to the wireless receiver and to the antenna array, the drone controller architecture configured to:
receive drone relay signals at the wireless receiver as a first signal type;
transform the drone relay signals to second and third signal types different than the first signal type;
broadcast the second and third signal types via the first and second antennae, respectively;
cooperate with a plurality of other aerial network drones to selectively form a multi-drone network, which communicates with at least one of a satellite and a satellite signal transformation unit; and
wherein, when forming the multi-drone network, repeatedly triangulate an ownship drone position as a function of (i) data received from multiple neighboring aerial network drones in the plurality of aerial network drones and (ii) data received from at least one of the satellite and the satellite signal transformation unit.

17. The aerial network drone of claim 16 further comprising a flight system coupled to the drone controller architecture, the drone controller architecture configured to command the flight system to generally maintain the aerial network drone in an assigned hover position in the multi-drone network, while broadcasting the second and third signal types.

18. The aerial network drone of claim 16 wherein the drone controller architecture is further configured to:
selectively transmit a request to return location data to a specific user device; and
transmit the requested location data to an authority if received from the specific user device.

19. The aerial network drone of claim 16 wherein the drone controller architecture is further configured to perform cyclic redundancy check processes utilizing data provided by at least one of the neighboring aerial network drones, while broadcasting the second and third signal types via the first and second antennae, respectively.

* * * * *